United States Patent Office 3,407,780
Patented Oct. 29, 1968

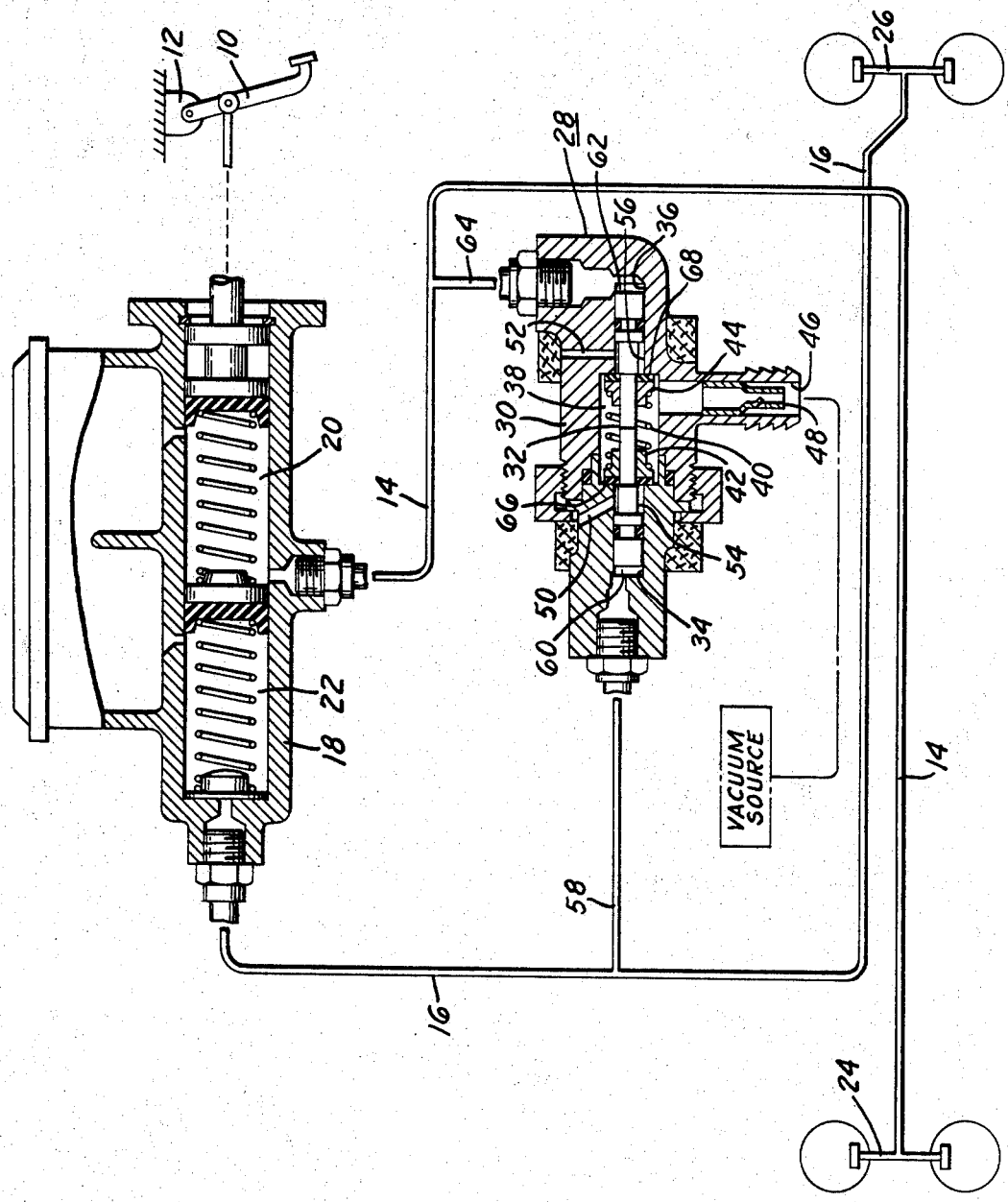

3,407,780
SPLIT BRAKE SYSTEM FLUID LOSS AUDIBLE
WARNING DEVICE
Robert M. Van House and Edward J. De Hoff, Dayton,
Ohio, assignors to General Motors Corporation, Detroit, Mich., a corporation of Delaware
Filed Oct. 1, 1965, Ser. No. 492,135
3 Claims. (Cl. 116—65)

ABSTRACT OF THE DISCLOSURE

A dual circuit fluid pressure braking system has a pressure loss sensor in which the pressures act on opposite ends of a pair of abutting pistons so that the forces generated by the brake fluid pressures become unbalanced when one brake circuit suffers a pressure loss, thereby opening a valve to allow fluid flow between two differing pressure sources. A fluid, flow sensitive indicator is activated when the fluid flow occurs and indicates the pressure loss.

This invention relates to warning devices and more particularly to a device warning a vehicle operator of a fluid loss of a portion of a split braking system.

In a split braking system wherein hydraulic fluid under pressure is supplied to different sets of vehicle brakes from a single master cylinder, a loss of braking pressure in one of the systems very often goes unnoticed by a vehicle operator. This is primarily due to the fact that sufficient braking capability remains, using one of the braking systems, to stop a vehicle under normal stopping conditions. However, under conditions of rapid or panic braking, a certain amount of braking is lost and the vehicle will not come to a halt in the same distance as it will with both brake systems functioning. This can bring about a hazardous situation of which a vehicle operator should be apprised.

It is an object of the present invention to provide an improved warning device suitable for use with a dual or split braking system which alerts a vehicle operator to the fact of a pressure loss within one of the systems.

It is another object of the present invention to provide an improved audible warning device responsive to an imbalance in pressure between two braking systems designed to function simultaneously thereby alerting a vehicle operator of a failure in one of the systems.

It is still another object of the present invention to carry out the aforementioned objects economically with a device adaptable for use on a braking system of common design.

Further objects and advantages of the present invention will be apparent from the following description, reference being had to the accompanying drawing wherein a preferred embodiment of the present invention is clearly shown.

In the drawing:

In the single figure drawing, the subject invention is illustrated in section operatively positioned in a braking system diagrammatically shown.

Referring to the drawing, a brake pedal 10 is adapted to be pivoted on mounting bracket 12 to provide a force in brake lines 14 and 16 through master cylinder 18. Master cylinder 18 is a split type having power chambers 20 and 22 arranged to build up hydraulic pressure in lines 14 and 16, respectively, and communicate said pressure build up to vehicle brakes 24 and 26. Typically, brakes 24 and 26 are the front and rear wheel brakes of a vehicle, respectively. Under normal operating conditions, the pressure build-up in chambers 20 and 22 is equally communicated to the vehicle brakes through lines 14 and 16, respectively.

A sensor, generally designated by numeral 28, comprises a housing 30 and a spool valve 32 translationally shiftable in oppositely disposed bores 34 and 36. Passage 38 is situated between bores 34 and 36 and houses centering spring 40. Spring retainers 42 and 44 are carried on spool valve 32 and are biased into engagement with opposite ends of passage 38 by spring 40.

Housing 30 has an inlet 46 from a vacuum source and houses a whistle device 48. Inlets 50 and 52 from the atmosphere communicate atmospheric pressure into grooves 54 and 56, respectively, formed in spool valve 32. Line 58 is tapped from line 16 and communicates braking pressure from power chamber 22 to chamber 60 formed on one end of spool valve 32 in bore 34. Chamber 62 formed on an opposite end of spool valve 32 in bore 36 is communicated braking pressure from chamber 20 through line 64. Resilient seals 66 and 68 are carried by spring retainers 42 and 44, respectively, to provide positive sealing between grooves 54 and 56 relative to passage 38.

In operation, under normal operating conditions, a braking pressure generated in chambers 20 and 22 by pivotal movement of pedal 10 is equally communicated through lines 14 and 16 to brakes 24 and 26 to provide a braking action. This type of brake system is referred to as a dual brake system utilizing a split master cylinder. It is understood that the subject invention is operative in an environment wherein separate master cylinders are used. Therefore, equal pressure is communicated through lines 58 and 64 into chambers 60 and 62 to maintain spool valve 32 in a centered disposition relative to passage 38. Spool valve 32 is therefore normally maintained in a balanced condition.

When a fluid loss occurs in one of the brake lines 14 and 16 or in the brakes 24 and 26, a pressure loss will occur in one of the braking systems when brake pedal 10 is pivotally moved during a brake actuation. Depending on which of the brake systems fails, an unequal pressure is then exerted in chambers 60 or 62 causing a spool valve 32 to become unbalanced. Assuming that a pressure drop exists in line 14, a lower pressure is communicated to chamber 62 through line 64 and, therefore, the pressure in chamber 60 becomes dominant. Spool valve 32 therefore shifts against the bias of spring 40 toward chamber 62 resulting in seal 66 being drawn away from its seat on the end of passage 38. A path for fluid communication then exists fom inlet 50 through groove 54 through passage 38 to inlet 46. The vacuum source normally applies a negative pressure to inlet 46 and, therefore, air from the atmosphere is drawn through whistle device 48. This causes a sound audible in the immediate vicinity of the vehicle alerting the vehicle operator to the fact of a failure in one of the braking systems. The system unaffected by the pressure loss continues to function normally.

If a pressure loss or fluid loss, such as described previously, occurs in line 16, power chamber 22 or in the brakes 26, a similar cycle takes place with spool valve 32 shifting in the opposite direction from that previously described. Therefore, using the sensor herein described, a vehicle operator on a vehicle equipped with a dual braking system is immediately apprised of a pressure or fluid loss in one of the brake systems and can thereafter more carefully conduct his driving to offset the possible hazardous situation developing when one of the braking systems becomes inoperative. It should be stressed that the fact of a failure when one of the braking systems on a dual braking system is installed on a vehicle does not necessarily bring about a dangerous condition but rather maintains a certain braking capability not present when a single braking system fails on vehicles not so equipped. However, vehicle operators have a tendency to drive their vehicles with a certain braking capability in mind and, unless warned of the availability of lesser braking than normally available in that vehicle, may tend to underestimate the stopping distance required when a portion of the total braking capability disappears. The invention is intended to provide a device which forewarns the vehicle operator of a potential danger.

While the embodiment of the present invention, as herein disclosed constitutes a preferred form, it is to be understood that other forms might be adopted.

What is claimed is as follows:

1. In a dual fluid circuit brake system, a circuit fluid pressure loss sensor comprising:

a housing having a bore therein formed to provide opposed end chambers and a central chamber and an intermediate chamber on each side of said central chamber, said opposed end chambers being respectively fluid connected with the brake system fluid circuits;

opposed pistons in said bore extending through said intermediate chambers with their inner ends in abutting relation in said central chamber, their outer ends each having a face exposed to fluid pressure of one of the brake system fluid circuits, and having seals intermediate their ends sealing said end chambers from said intermediate chambers;

first and second sources of different fluid pressures respectively fluid connected with said central chamber and said intermediate chambers;

first and second normally closed valves in said central chamber cooperating with said pistons to respectively seal said central chamber from said intermediate chambers;

means responsive to piston movement caused by a predetermined unbalance of forces exerted on said pistons by brake circuit fluid pressures in said opposed end chambers to move one of said normally closed valves to fluid connect said central chamber and one of said intermediate chambers to cause fluid flow from the higher pressured one of said pressure sources toward the lower pressured one of said pressure sources;

and means responsive to said fluid flow for indicating a pressure loss in one of the brake system fluid circuits.

2. The fluid pressure loss sensor of claim 1, said first and second sources of fluid pressures being sources of different air pressures, and said fluid flow responsive pressure loss indicating means being a sound generator activated by air flow.

3. The fluid pressure loss sensor of claim 1, said normally closed valves each having one of said pistons extending therethrough in slidable relation, and a compression spring around said piston inner ends and seated on said valves and urging said valves in opposed directions.

References Cited
UNITED STATES PATENTS 3,228,194  1/1966  Blair _____ 303—84 XR
2,754,788  7/1956  Sperry _____ 116—65

S. CLEMENT SWISHER, *Acting Primary Examiner.*

J. W. ROSKOS, *Assistant Examiner.*